United States Patent
Tominaga et al.

(10) Patent No.: US 10,021,687 B2
(45) Date of Patent: Jul. 10, 2018

(54) WIRELESS COMMUNICATION DEVICE

(71) Applicant: PANASONIC INTELLECTUAL PROPERTY MANAGEMENT CO., LTD., Osaka (JP)

(72) Inventors: Hideo Tominaga, Fukuoka (JP); Shinji Fukuda, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 14/940,215

(22) Filed: Nov. 13, 2015

(65) Prior Publication Data
US 2016/0150535 A1    May 26, 2016

(30) Foreign Application Priority Data
Nov. 21, 2014    (JP) ................. 2014-236598

(51) Int. Cl.
*H04W 72/04*    (2009.01)
*H04L 5/22*    (2006.01)
*H04L 5/00*    (2006.01)
*H04W 72/08*    (2009.01)
*H04W 84/20*    (2009.01)
(Continued)

(52) U.S. Cl.
CPC ......... *H04W 72/0446* (2013.01); *H04L 5/006* (2013.01); *H04L 5/22* (2013.01); *H04W 72/082* (2013.01); *H04W 72/085* (2013.01); *H04B 1/1027* (2013.01); *H04L 12/2827* (2013.01); *H04L 2012/2841* (2013.01); *H04W 84/20* (2013.01); *Y02B 60/50* (2013.01); *Y02D 70/00* (2018.01)

(58) Field of Classification Search
None
See application file for complete search history.

(56) References Cited

U.S. PATENT DOCUMENTS 7,075,909 B1 *    7/2006    Iinuma ................. H04W 52/50
                                                            370/329
8,433,276 B2    4/2013    Morishita
(Continued)

FOREIGN PATENT DOCUMENTS

DE    102011054624    4/2013
EP    2645794    10/2013
WO    2005/062798    7/2005

OTHER PUBLICATIONS

"Digital Enhanced Cordless Telecommunications (DECT); Ultra Low Energy (ULE); Machine to Machine Communications; Part 1: Home Automation Network (phase 1)", ETSI TS 102 939-1 V1.1.1, pp. 1-169 (Apr. 2013).

(Continued)

*Primary Examiner* — Ayaz Sheikh
*Assistant Examiner* — Faiyazkhan Ghafoerkhan
(74) *Attorney, Agent, or Firm* — Greenblum & Bernstein, P.L.C.

(57) ABSTRACT

A wireless communication device for packet communication is provided. Based on an interfering wave level that is stored in carrier sense table, the number of empty slots for every threshold of interfering wave is obtained, and, in a case where the number of empty slots for the threshold exceeds a predetermined value, a slave station is notified the number of empty slots.

4 Claims, 7 Drawing Sheets

(51) Int. Cl.
*H04B 1/10* (2006.01)
*H04L 12/28* (2006.01)

(56) References Cited

U.S. PATENT DOCUMENTS

| | | | |
|---|---|---|---|
| 8,688,067 B2 | 4/2014 | Morishita | |
| 2001/0046867 A1* | 11/2001 | Mizoguchi | H04B 7/005 455/452.2 |
| 2001/0049281 A1* | 12/2001 | Duplessis | H04W 16/32 455/424 |
| 2004/0203348 A1* | 10/2004 | Haartsen | H04W 84/20 455/41.1 |
| 2006/0068820 A1* | 3/2006 | Sugaya | H04W 28/20 455/512 |
| 2011/0013542 A1* | 1/2011 | Yu | H04W 74/006 370/280 |
| 2013/0039328 A1* | 2/2013 | Majidi-Ahy | H04L 1/0001 370/329 |
| 2013/0121224 A1* | 5/2013 | Sugitani | H04J 3/1694 370/311 |
| 2013/0242806 A1* | 9/2013 | Nagata | H04W 72/0446 370/256 |
| 2014/0022125 A1* | 1/2014 | Zhu | H01Q 3/2611 342/377 |
| 2014/0024321 A1* | 1/2014 | Zhu | H04B 1/18 455/77 |
| 2014/0094170 A1* | 4/2014 | Kilian | H04M 1/727 455/435.1 |
| 2015/0124635 A1* | 5/2015 | Ukita | H04L 1/0002 370/252 |
| 2016/0241276 A1* | 8/2016 | Zhu | H04B 1/18 |

OTHER PUBLICATIONS

"Digital Enhanced Cordless Telecommunications (DECT); Common Interface (CI); Part 2: Physical Layer (PHL)", ETSI EN 300 175-2 V1.9.1, pp. 1-64 (Sep. 2005).
"Digital Enhanced Cordless Telecommunications (DECT); Common Interface (CI); Part 3: Medium Access Control (MAC) layer", ETSI EN 300 175-3 V1.9.1, pp. 1-235 (Sep. 2005).
"Digital Enhanced Cordless Telecommunications (DECT); Common Interface (CI); Part 5: Network (NWK) layer", ETSI EN 300 175-5 V1.9.1, pp. 1-309 (Sep. 2005).
The Extended European Search Report from European Patent Office (EPO) dated Apr. 22, 2016 for European Patent pplication No. 15195380.9.

* cited by examiner

FIG. 5

| THRESHOLD [dbm] | NUMBER OF EMPTY SLOTS |
|---|---|
| -33 | 0 |
| -39 | 1 |
| -45 | 1 |
| -51 | 1 |
| -57 | 2 |
| -63 | 2 |
| -69 | 3 |
| -75 | 3 |
| -81 | 4 |
| -87 | 4 |
| -93 | 4 |

FIG. 6

| | 1 | 2 | 3 | 4 | 5 | 6 | 7 | 8 | 9 | 10 | 11 | 12 | EMPTY SLOT | THRESHOLD [dbm] |
|---|---|---|---|---|---|---|---|---|---|---|---|---|---|---|
| 1 | 0 | −20 | −20 | −20 | −20 | −20 | −20 | −20 | −20 | −20 | −20 | −20 | − | −33 |
| 2 | 0 | −20 | −35 | −20 | −20 | −20 | −20 | −20 | −20 | −20 | −20 | −20 | 3 | −33 |
| 3 | 0 | −90 | −80 | −70 | −20 | −20 | −20 | −20 | −20 | −20 | −20 | −20 | 2,3,4 | −69 |
| 4 | 0 | −90 | −80 | −70 | −70 | −20 | −20 | −20 | −20 | −20 | −20 | −20 | 2,3,4,5 | −69 |
| 5 | 0 | −95 | −95 | −95 | −20 | −20 | −20 | −20 | −20 | −20 | −20 | −20 | 2,3,4 | −75 |

WIRELESS COMMUNICATION DEVICE

BACKGROUND OF THE INVENTION

1. Field of the Invention

The present invention relates to a wireless communication device.

2. Description of the Related Art

In recent years, with the remarkable spread of data communication that is performed in a wireless manner, there have been advances in high communication speed, miniaturization of a wireless communication device, and low power consumption. For example, wireless communication in compliance with a Digital Enhanced Cordless Telecommunications (DECT) scheme that has been spread worldwide as a communication scheme for digital cordless telephones is stipulated in ETSI EN 300 175-2: "Digital Enhanced Cordless Telecommunications (DECT); Common Interface (CI); Part 2: Physical Layer (PHL)," ETSI EN 300 175-3: "Digital Enhanced Cordless Telecommunications (DECT); Common Interface (CI); Part 3: Medium Access Control (MAC) layer," and ETSI EN 300 175-5: "Digital Enhanced Cordless Telecommunications (DECT); Common Interface (CI); Part 5: Network (NWK) layer." Also in Japan, the use of wireless devices in compliance with the DECT scheme was approved, and wireless communication devices, such as a cordless telephone and an intercommunication system, have been of practical use. Time division multiplex communication is employed in the wireless communication in compliance with the DECT scheme. A base unit that operates as a control station transmits a control signal that serves as a reference for timing for the time division multiplex communication. A handset that operates as a slave station establishes synchronization for the time division multiplex communication by receiving a control signal, and performs communication. While changing a reception frequency for every frame, the base unit waits for a connection request from the handset, and notifies the handset of information relating to a change in a standby frequency, using a control signal. In a case where communication between the base unit and the handset is started, the handset tunes the standby frequency of the base unit, determines a frequency, and notifies the base unit of a communication starting request. The base unit receives the communication starting request, and thus the communication between the base unit and the handset is started.

In recent years, a system in which household electrical appliances within a house are controlled from outside of the house, a household crime prevention system, or the like has gained popularity. Developments in wireless communication for communication between apparatuses on such a home automation network have been made. A method for packet communication suitable for communication between apparatuses on the home automation network, which is based on the wireless communication in compliance with the DECT scheme, is stipulated in ETSI TS 102 939-1: "Digital Enhanced Cordless Telecommunications (DECT); Ultra Low Energy (ULE); Machine to Machine Communications; Part 1; Home Automation Network (Phase 1)" (communication that is stipulated in ETSI TS 102 939-1: "Digital Enhanced Cordless Telecommunications (DECT); Ultra Low Energy (ULE); Machine to Machine Communications; Part 1; Home Automation Network (Phase 1)" is hereinafter referred to as DECT ULE communication). An object of the DECT ULE communication is to apply the DECT ULE communication to a battery-operated wireless communication device such as a sensor device that has the same usage value as a window sensor in the crime prevention system. Furthermore, a technology is disclosed that is useful for an improvement in responsiveness and for realization of low power consumption. For example, a method is disclosed in which in the ULE communication, the base unit detects a level of an interfering wave and notifies the handset of a threshold of detection of the interfering wave in a reception environment in the base unit and information (hereinafter expressed as channel information) on an empty slot that is determined with the threshold. In a case where the communication is started between the base unit and the handset, the handset operates in such a manner that the slot that is notified with the channel information that is sent from the base unit is selected and the communication is activated. Accordingly, the frequency with which a communication path fails to be activated due to interference caused by the interfering wave is reduced, and the improvement in responsiveness and the reduction in power consumption are realized.

SUMMARY OF THE INVENTION

A wireless communication device includes a control station and a slave station that perform communication using a time division multiplex scheme. The control station transmits channel information notifying a slot and a frequency that are available. The slave station selects the slot and the frequency that are notified with the channel information, and activates the communication with the control station. The control station includes a wireless communication unit that performs wireless communication, an interfering wave level storage unit in which a reception signal strength of an interfering wave for every slot and every frequency is stored, a channel selection unit that selects the slot and the frequency that are notified with the channel information, based on the reception signal strength of the interfering wave that is stored in the interfering wave level storage unit, and a control unit that controls the entire wireless communication device. The control unit controls the wireless communication unit in such a manner that a reception level of the interfering wave for every channel is measured, and writes the measured reception level to the interfering wave level storage unit. In a case where the slave station is to be notified of the channel information, the control unit operates in such a manner that the slot and the frequency that are selected in the channel selection unit are notified. The channel selection unit compares a threshold of the reception signal strength of the interfering wave for every slot and a threshold of the reception signal strength of the interfering wave in one selected frequency, using the reception signal strength of the interfering wave that is stored in the interfering wave level storage unit, a threshold of the reception signal strength of the interfering wave that is determined in advance, and a threshold of the number of empty slots that are determined for every threshold of the reception signal strength of the interfering wave, and in a case where the number of slots, for each of which the reception signal strength of the interfering wave in the one selected frequency does not exceed the threshold of the reception signal strength, exceeds the threshold of the number of empty slots that are determined in advance for every threshold of the reception signal strength, the channel selection unit operates in such a manner that a combination of a slot, for which the reception signal strength of the interfering wave does not exceed the threshold of the reception signal strength, and the selected frequency is selected.

BRIEF DESCRIPTION OF DRAWINGS

FIG. 5 is a diagram illustrating one example of a threshold of an interfering wave at the time of channel selection by the base unit according to the first exemplary embodiment of the present invention and of the number of empty slots that are necessary for every threshold;

FIG. 6 is a diagram illustrating an example of each frequency for the base unit according to the first exemplary embodiment of the present invention, an interfering wave for every slot, and a slot that is selected at that time.

DETAILED DESCRIPTION OF THE PREFERRED EMBODIMENT

A technology in which a slot that is used by a handset is selected based on a threshold of detection of an interfering wave in a reception environment in a base unit and on channel information that is determined with the threshold, is disclosed, as a wireless communication scheme, but a method of performing control, such as how the value of the detection of the interfering wave is determined, is not disclosed, in ETSI EN 300 175-2: "Digital Enhanced Cordless Telecommunications (DECT); Common Interface (CI); Part 2: Physical Layer (PHL)," ETSI EN 300 175-3: "Digital Enhanced Cordless Telecommunications (DECT); Common Interface (CI); Part 3: Medium Access Control (MAC) layer," ETSI EN 300 175-5: "Digital Enhanced Cordless Telecommunications (DECT); Common Interface (CI); Part 5: Network (NWK) layer," ETSI TS 102 939-1: "Digital Enhanced Cordless Telecommunications (DECT); Ultra Low Energy (ULE); Machine to Machine Communications; Part 1; Home Automation Network (Phase 1)". In a case where the threshold of the detection of the interfering wave is determined strictly, the number of empty slots is decreased in an environment where the interfering wave occurs frequently. In a case where multiple handsets are accommodated, if timings at which the multiple handsets start to perform communication overlap, this poses the risk that the same slot is selected, collision between communications takes place, and activation fails. On the other hand, in a case where the threshold of the detection of the interfering wave is determined loosely, the number of slots that are selectable is increased, but this poses the problem that a difference between high and low levels of the interfering wave for the selectable slots is increased and it is difficult to select a slot with a low level of the interfering wave.

An embodiment of the present invention will be described below.

First Exemplary Embodiment

Configuration of a Home Automation Network System

Figure 1:
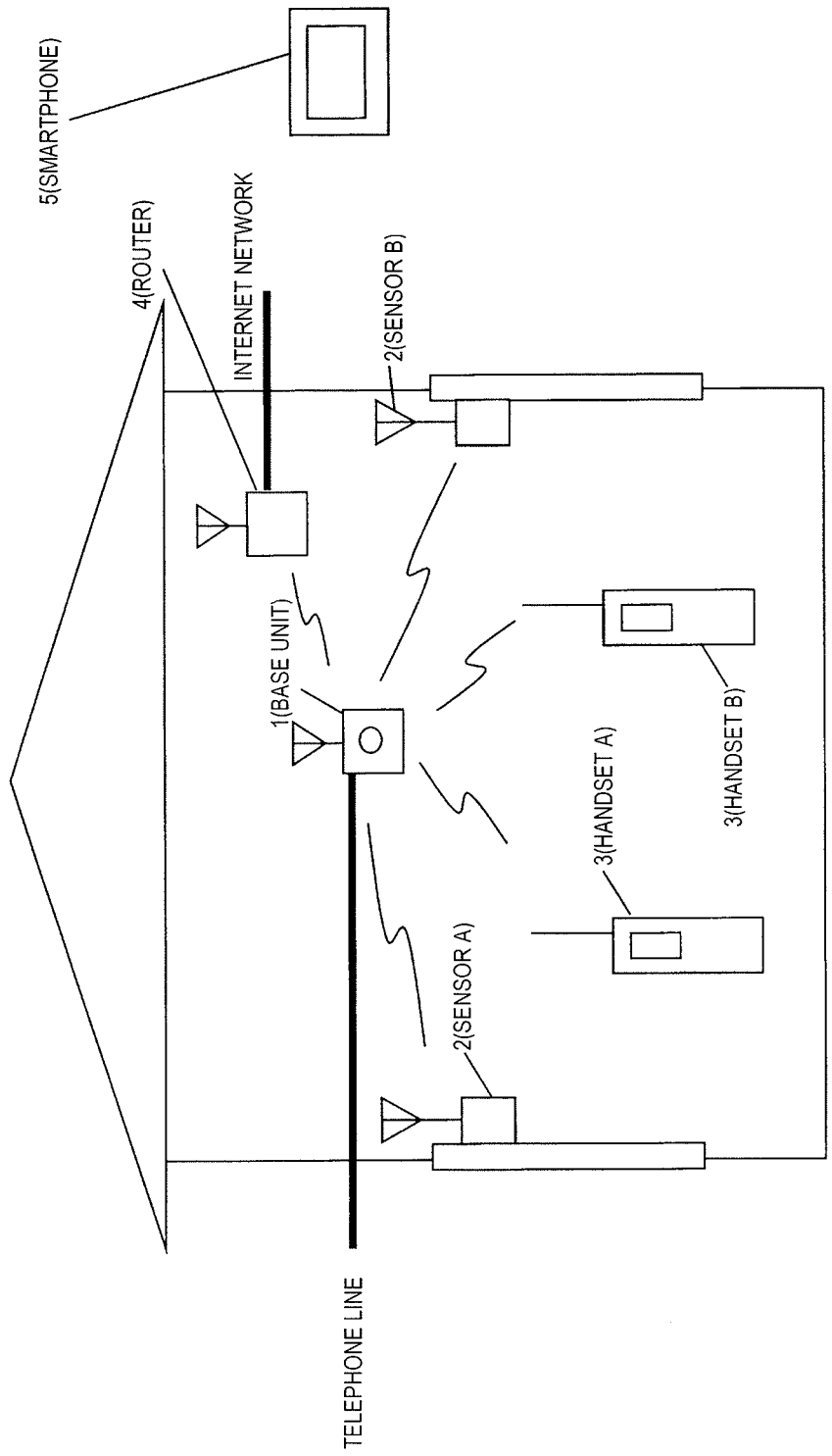
FIG. 1 is a diagram illustrating one example of a home automation network system that uses a wireless communication device according to a first exemplary embodiment of the present invention.

A configuration example of a wireless communication device according to a first exemplary embodiment is described. FIG. 1 is a diagram illustrating one example of a home automation network system that uses the wireless communication device according to the present embodiment.

The home automation network system that uses the wireless communication device according to the present invention, which is described in FIG. 1, is a system that realizes a telephone function for an outside-line call or for an inside-line call and a crime prevention function of notifying a user inside of or outside of a house that a window is opened or closed. FIG. 1 illustrates a case where the home automation network system is configured from base unit 1, sensor A2, sensor B2, handset A3, handset B3, router 4, and smartphone 5. Sensor A2 and sensor B2 that have the same function, and handset A3 and handset B3 that have the same function are described below as sensor 2 and handset 3, respectively.

In the home automation network system that uses the wireless communication device according to the present invention, which is described in FIG. 1, communication through wireless communication, for example, in compliance with a DECT scheme is possible between base unit 1 and sensor 2 and between base unit 1 and handset 3, and communication through wireless communication, for example, in compliance with a WiFi scheme is possible between base unit 1 and router 4. Base unit 1 is connected to smartphone 5 over the Internet through router 4.

A user performs an outside-line telephone calling or an inside-line telephone calling with handset 3, by using the home automation network system that uses the wireless communication device according to the present invention, which is illustrated in FIG. 1.

The home automation network system that uses the wireless communication device according to the present invention, which is illustrated in FIG. 1, operates in a normal mode or in a crime prevention mode. The crime prevention mode is a mode in which the user is notified with an alarm and the like that a window is opened, and the normal mode is a mode in which the user is not notified that the window is opened. The user activates the crime prevention mode when he/she leaves a house or goes to bed, and is protected against a burglar's break-in. In a case where the home automation network system operates in the crime prevention mode, when sensor 2 notifies base unit 1 that the window is opened, base unit 1 notifies handset 3 that the window is opened, base unit 1 and handset 3 raise the alarm, and thus a person in each room is notified that the window is opened. Base unit 1 makes a call to a designated telephone number through a telephone line, and, when the other party answers the call, transits an audio message notifying that the window is opened. Base unit 1 transmits an electronic mail that notifies a registered address that the window is opened, through router 4 over the Internet, and notifies the user of smartphone 5 that the window is opened.

Configuration of Base Unit 1

Figure 2:
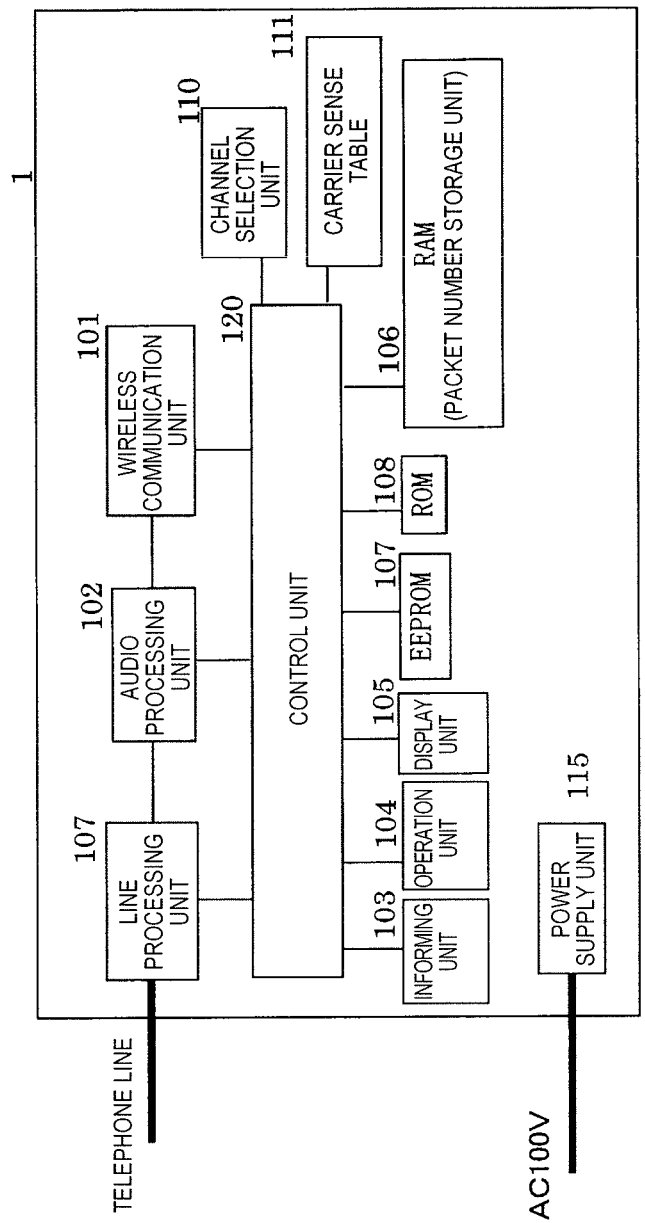
FIG. 2 is a block diagram illustrating one example of a configuration of a base unit according to the first exemplary embodiment of the present invention.

A configuration example of base unit 1 is described. FIG. 2 is a block diagram illustrating a configuration example of base unit 1.

In FIG. 2, base unit 1 has wireless communication unit 101, audio processing unit 102, informing unit 103, operation unit 104, display unit 105, RAM (packet number storage unit) 106, EEPROM 107, ROM 108, channel selection unit 110, carrier sense table 111, power supply unit 115, and control unit 120.

Wireless communication unit 101 transmits and receives control data or a packet for wireless link establishment or a data telephone call to and from sensor 2, handset 3, and router 4 in a predetermined scheme that depends on a device of each. In addition, in the present specification, "wireless communication" is defined as including wireless transmission and wireless reception.

Audio processing unit 102 converts an audio signal that is input from the telephone line, into a digital signal, generates audio data for transmission to handset 3, converts audio data that is received from handset 3, or data for audio guidance that notifies that a window is opened, into an analog signal, and outputs the resulting analog signal to the telephone line.

In the case where the home automation network system operates in the crime prevention mode, when sensor 2 notifies base unit 1 that the window is opened, informing unit 103 outputs an informing sound.

Operation unit 104 is a button to which a user operation is applied. The user operations, for example, include an operation of stopping the informing sound, an operation of switching between the crime prevention mode and the normal mode, and the like.

Information is displayed, for the user, on display unit 105. The information, for example, is information indicating whether a current operation state is the crime prevention mode or the normal mode.

Among pieces of information necessary for executing a program for controlling base unit 1, RAM (packet number storage unit) 106 is used for storing data that does not need to be retained at the time of power-off. In a case where the entire RAM (packet number storage unit) 106, also including a storage unit for managing the packet number that is transmitted from the sensor, is referred to, this is described below as RAM 106. In a case where only a storage unit for managing the packet number, of RAM (packet number storage unit) 106 is referred to, this is described below as packet number storage unit 106.

Among the pieces of information necessary for executing the program for controlling base unit 1, EEPROM 107 is used for storing data that needs to be retained even at the time of power-off. For example, an identification number for identifying base unit 1 itself or the other party, a telephone number of or a mail address of the other party in a case where the user outside of a house is notified that the window is opened, and the like, which are necessary for performing wireless communication with sensor 2 and handset 3, are stored.

ROM 108 is a memory into which the program for controlling base unit 1 is embedded.

In a frequency that is designated by control unit 120, channel selection unit 110 uses reception signal strength of an interfering wave that is stored in carrier sense table 111, a threshold of the reception signal strength of the interfering wave, and a threshold of the number of empty slots that is determined for every threshold of the reception signal strength of the interfering wave, and thus determines a threshold of the reception signal strength that satisfies the threshold of the number of empty slots and selects a slot that satisfies the determined threshold of the reception signal strength of the interfering wave. A channel selection operation in channel selection unit 110 will be described below.

A level of the interfering wave is stored in carrier sense table 111. The level of the interfering wave is managed for every frequency and every slot.

Power supply unit 115 produces direct current that is necessary for each unit of base unit 1 to operate, from 100 V commercial electric power, and supplies the direct current to each block of base unit 1 (connection to each unit is not illustrated).

Control unit 120 is configured as a central processing unit (CPU), and controls operation of the entire base unit 1 in cooperation with each unit described above. Control unit 120 controls wireless communication unit 101 in such a manner that a reception level of the interfering wave for every channel is measured, writes the measured reception level to carrier sense table 111, selects a frequency from among standby frequencies, notifies channel selection unit 110 of the selected frequency, and transmits the threshold and the slot that are selected in channel selection unit 110, to sensor 2. Operation of control unit 120 will be described in detail below.

Functional units that are included in base unit 1 are not limited to 101 to 120 that are illustrated in FIG. 2, and may include other functional units. The other functional units may be ones that realize main functions of base unit 1, and may be ones that realize auxiliary functions that assist the main functions.

Configuration of Sensor 2

Figure 3:
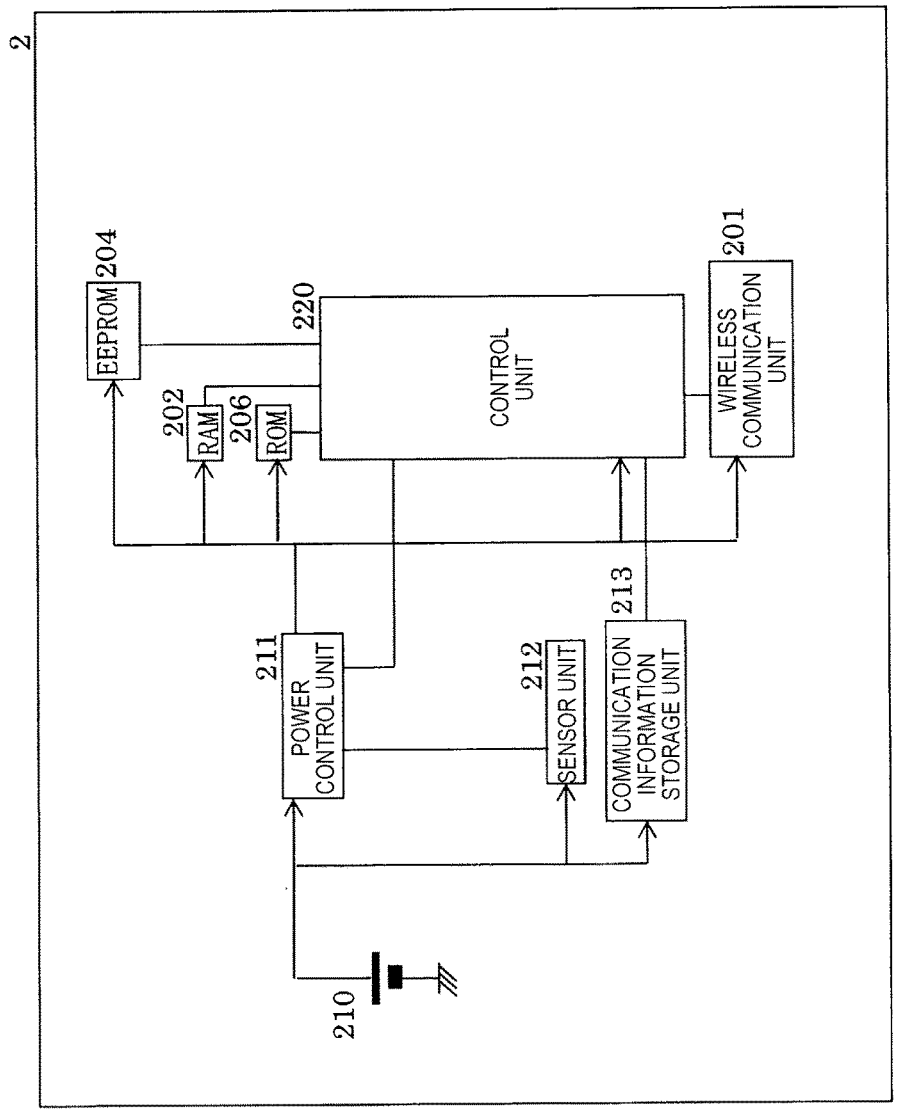
FIG. 3 is a block diagram illustrating one example of a configuration of a sensor according to the first exemplary embodiment of the present invention.

A configuration example of sensor 2 is described. FIG. 3 is a block diagram illustrating a configuration example of sensor 2.

In FIG. 3, sensor 2 has wireless communication unit 201, RAM 202, EEPROM 204, ROM 206, battery 210, power control unit 211, sensor unit 212, communication information storage unit 213, output factor display unit 214, and control unit 220.

Wireless communication unit 201 transmits and receives the control data or the packet for the wireless link establishment or the data telephone call to and from base unit 1 in a predetermined scheme.

Among pieces of information necessary for executing a program for controlling sensor 2, RAM 202 is used for storing data that does not need to be retained when the power control unit interrupts power supply.

Among the pieces of information necessary for executing the program for controlling sensor 2, EEPROM 204, which is an nonvolatile memory, is used for storing data that needs to be retained even at the time of power-off. For example, the identification number for identifying sensor 2 itself or the other party, which is necessary for performing the wireless communication with base unit 1, and the like are stored.

ROM 206 is a memory into which a program for controlling sensor 2 is embedded.

Battery 210 is a battery that supplies power necessary for operation of sensor 2. For example, a lithium battery with a rated output of 3V and the like are used. Power is supplied from battery 210 directly to sensor unit 212 and communication information storage unit 213, and is supplied from battery 210 through power control unit 211 to wireless communication unit 201, RAM 202, EEPROM 204, ROM 206, and control unit 220.

Power control unit 211 supplies the power that is supplied from battery 210, to wireless communication unit 201, RAM 202, EEPROM 204, ROM 206, and control unit 220 according to a signal from sensor unit 212, and cuts off power that is supplied to wireless communication unit 201, RAM 202, EEPROM 204, ROM 206, and control unit 220 according to a signal from control unit 220. In a case where battery 210 is newly mounted and power starts to be supplied from battery 210, the power is supplied from battery 210 to wireless communication unit 201, RAM 202, EEPROM 204, ROM 206, and control unit 220.

Sensor unit 212 detects that the window is opened, and outputs a signal (described as a power-on signal) that is to be supplied to wireless communication unit 201, RAM 202, EEPROM 204, ROM 206, and control unit 220, to power control unit 211.

Stored in communication information storage unit 213 is a slot that is used for communication with the packet number.

Control unit 220 is configured as a central processing unit (CPU) and controls operation of the entire sensor 2 in cooperation with each unit described above. When sensor unit 212 detects that the window is opened, control unit 220 activates wireless communication, notifies base unit 1 that the window is opened, stores the slot used in communication information storage unit 213, and outputs to power control unit 211 a signal (described as a power-off signal) for interrupting the wireless communication and cutting off power supply to wireless communication unit 201, RAM 202, EEPROM 204, ROM 206, and control unit 220. Control unit 220 operates in such a manner that a slot that results from excluding the previously-communicated slot and that is stored in communication information storage unit 213 from slots in channel information that is notified from base unit 1 is preferentially selected. Operation of control unit 220 will be described in detail below.

Functional units that are included in sensor 2 are not limited to 201 to 220 that are illustrated in FIG. 3, and may include other functional units. The other functional units may be ones that realize main functions of sensor 2, and may be ones that realize auxiliary functions that assist the main functions.

Operation of Each of Base Unit 1 and Sensor 2

An operational example of the home automation network system that uses the wireless communication device according to the present invention, which is described above, is described.

Figure 4:
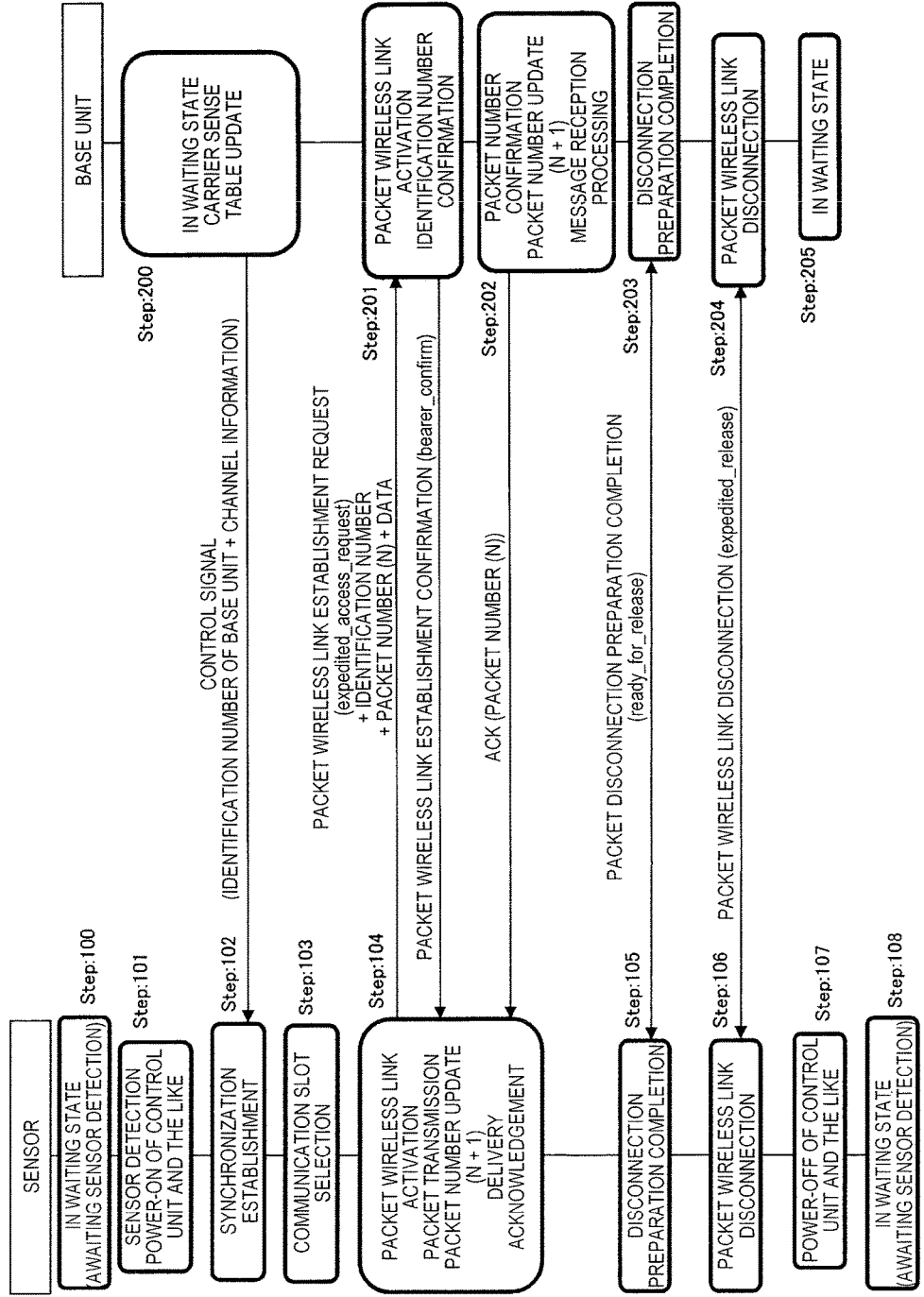
FIG. 4 is a diagram illustrating one example of an operation in which communication is started based on channel information that is notified from the base unit through wireless communication between the base unit and the sensor according to the first exemplary embodiment of the present invention.

FIG. 4 is a diagram illustrating one example of an operation in which communication starts based on the channel information that is notified from base unit 1 through the wireless communication between base unit 1 and sensor 2 when it is detected that the window is opened.

In a waiting state, in sensor 2, power is supplied only to sensor unit 212 and communication information storage unit 213, and sensor unit 212 operates in such a manner as to detect that the window is opened (Step: 100).

On the other hand, in the waiting state, while transmitting a signal (hereinafter referred to as a control signal) for enabling the sensor to recognize the base unit 1 and to retain synchronization, control unit 120 controls wireless communication unit 101 in such a manner that wireless communication unit 101 is controlled to receive a signal from the sensor and writes the level of the interfering wave that is received at this time, to carrier sense table 111. Control unit 120 tunes a signal from the sensor to a standby frequency and notifies channel selection unit 110 of a frequency. Channel selection unit 110 selects a slot based on the frequency that is notified and on the level of the interfering wave that is stored in carrier sense table 111, and notifies control unit 120 of the selected slot. Control unit 120 transmits the determined channel information as one portion of control signal information (Step: 200).

When it is detected in sensor unit 212 of sensor 2 that the window is opened, sensor unit 212 outputs the power-on signal to power control unit 211 (Step: 101), power is supplied to control unit 220 and the like through power control unit 211 (Step: 101), and control to perform the wireless communication with the base unit is started.

Control unit 220 that starts by the power being supplied to control unit 220 itself reads an identification number of the base unit and an identification number of sensor 2 itself from EEPROM 204, establishes synchronization to the base unit using the identification number of the base unit, and takes the channel information out of the received control signal (Step: 102).

Subsequently, control unit 220 reads a number of a slot that was used in the previous communication and that is stored in communication information storage unit 213, and preferentially selects a slot that results from excluding the slot that was used in the previous communication from slots that are notified with the channel information, for use (Step: 103). For example, in a communication scheme in which one frame is divided into NI slots, that is, slot 1, slot 2, and so forth up to slot M, multiplexing is performed for M communications, and thus time division multiple communication is performed, when the slot that was previously used is defined as slot N, an operation is performed in such a manner that a slot that is consistent with the slot that is notified with the channel information from base unit 1 is searched for in this sequence: slot (N+1), slot (N+2), . . . slot M, slot 0, slot 1, . . . slot (N−1), and slot (N), and a slot that is first consistent with the slot that is notified with the channel information is selected. For example, when the slot that was previously used is defined as slot N, if three slots that are notified with the channel information is slot 1, slot (N), and slot (N+2), slot (N+2) is selected. In the same manner, when the slot that was previously used is defined as slot N, if two slots that are notified with the channel information are slot 1 and slot (N), slot 1 is selected. In the same manner, when the slot that was previously used is defined as slot N, if one slot that is notified with the channel information is slot (N), slot (N) is selected.

Subsequently, when the selection of a communication slot is completed, sensor 2 starts an operation in which the wireless communication starts using the selected slot. Control unit 220 of sensor 2 reads an encryption key from communication information storage unit 213, and encrypts a message notifying the window is opened, using the encryption key. A packet that results from packetizing a packet wireless link establishment request and encrypted data is transmitted to base unit 1, on the slot that is selected in Step: 103, and control is performed in such a manner that delivery acknowledgement is performed (Step: 104). At this time, control unit 220 reads the packet number for the delivery acknowledgement that is attached to the packet, from communication information storage unit 213 and performs control in such a manner that the packet number which is stored in communication information storage unit 213 in preparation for the next-time packet transmission is updated. Control unit 220 reads the identification number which is stored in EEPROM 204 and performs control in such a manner that the identification number which is read as one portion of the wireless establishment request message is transmitted.

On the other hand, when receiving a packet wireless establishment request from sensor 2, control unit 120 of base unit 1 checks an identification number of sensor 2, which is sent, by comparing the identification number of sensor 2 against an identification number of every sensor that is stored in EEPROM 107, and determines from which sensor a signal is sent. In a case where the packet wireless establishment request comes from a registered handset, control unit 120 transmits a packet wireless establishment confirmation to sensor 2 and establishes a wireless link for packet communication (Step: 201).

Control unit 120 reads a corresponding packet number of the sensor, among the packet numbers that are stored in packet number storage unit 106, compares the packet number that is sent, against the packet number that is read, and determines whether or not the two packet numbers are the same. In a case where the packet number that is sent and the packet number of the sensor, which is stored in packet number storage section 106, are the same, control is performed in such a manner that processing that receives a message that is sent in the packet format, that is, a message notifying that the window is opened, for example, processing that activates the alarm in informing unit 103 or notifies handset 3 and smartphone 5 that the window is opened, is performed, that the packet number corresponding to sensor 2, which is stored in packet number storage section 106 in preparation for the next-time packet reception, is updated, and that the delivery acknowledgement (ACK) notifying sensor 2 that the packet is received is sent (Step: 202).

When the transmission and reception of the delivery acknowledgement (ACK) is completed and packet communication interruption preparation is completed, both sensor 2 and base unit 1 send a packet disconnection preparation completion message notifying that the packet communication interruption preparation is completed (Step: 105) (Step: 203).

When packet disconnection preparation completion is received and the other party recognizes that packet communication interruption preparation is completed, sensor 2 and base unit 1 transmit a packet wireless link disconnection message notifying that the packet wireless link is disconnected, and interrupts transmission and reception operations for the packet communication (Step: 106) (Step: 204).

When the transmission and reception operations for the packet communication are interrupted, control unit 220 of sensor 2 reads a slot number that is used this time into communication information storage unit 213, outputs the power-off signal to power control unit 211, and cuts off the power supply to wireless communication unit 201, RAM 202, EEPROM 204, ROM 206, and control unit 220 (Step: 107), and proceeds to the waiting state in which it is detected that the window is opened (Step: 108).

In the same manner, when the transmission and reception operations for the packet communication are interrupted, base unit 1 also proceeds to the waiting state in which base unit 1 waits for communication with the sensor (Step: 205).

In a case where base unit 1 and sensor 2 perform the communication through the wireless communication in compliance with the DECT scheme, the channel information is a message called MU Channel Info 1 that is a message for controlling a MAC layer, the packet wireless link establishment request is a message called expedited_access_request that is the message for controlling the MAC layer, a packet wireless link establishment confirmation is a message called bearer_confirm that is the message for controlling the MAC layer, the packet cutting-off preparation completion is a message called ready_for_release that is the message for controlling the MAC layer, and the packet wireless link cutting-off is a message called expedited_release. Packetization of data is performed in compliance with a FU10a format that is stipulated with a DLC layer, and a message (ACK) for the delivery acknowledgement is established in a FU10d format that is stipulated with the DLC layer.

On the other hand, in base unit 1, in the waiting state, while transmitting a signal (hereinafter referred to as a control signal) for enabling the sensor to recognize the base unit and to retain synchronization, control unit 120 controls wireless communication unit 101 in such a manner that wireless communication unit 101 is controlled to receive a signal from the sensor and writes the level of the interfering wave that is received at this time, to carrier sense table 111. Control unit 120 tunes a signal from the sensor to a standby frequency and notifies channel selection unit 110 of a frequency. Channel selection unit 110 selects a slot based on the frequency that is notified and on the level of the interfering wave that is stored in carrier sense table 111, and notifies control unit 120 of the selected slot. Control unit 120 transmits the determined channel information as one portion of control signal information (Step: 200).

Next, an example of an operation of selecting a slot for base unit 1 in Step: 200 in FIG. 4, which is described above, is described.

FIG. 5 is a diagram illustrating one example of a threshold of the interfering wave at the time of channel selection by the base unit according to the first exemplary embodiment of the present invention and of the number of empty slots that are necessary for every threshold. FIG. 5 illustrates combinations of a threshold of a detection level of the interfering wave that is determined to be available and of a lower-limit value of the number of slots that are necessary for setting slots, which are determined with such a threshold, to be slots that are to be notified with the channel information. For example, a (−93, 4) combination in the lowermost part means that, in one frequency, if the number of slots each of which has the level of the interfering wave that is −93 dbm or less is 4 or greater, the frequency, the threshold (which, in this case, is −93 dbm), and at least 4 slots each of which has the level of the interfering wave that is at the threshold or below are notified as the channel information. In the same manner, a (−87, 4) combination in the second lowermost part means that, in one frequency, if the number of slots each of which has the level of the interfering wave that is −87 dbm or less is 4 or greater, the frequency, the threshold (which, in this case, is −87 dbm), and at least 4 slots each of which has the level of the interfering wave that is at the threshold or below are notified as the channel information. A (−75, 3) combination in the fourth lowermost part means that, in one frequency, if the number of slots each of which has the level of the interfering wave that is −75 dbm or less is 3 or greater, the frequency, the threshold (which, in this case, is −75 dbm), and at least 3 slots each of which has the level of the interfering wave that is at the threshold or below are notified as the channel information. A (−33, 0) combination in the uppermost part means that, in one frequency, regardless of whether or not the level of the interfering wave is −33 dbm or less, the frequency, the threshold (which, in this case, −33 dbm), and a slot which has the level of the interfering wave that is at the threshold or below are notified as the channel information, and means that, if there is no slot which has the level of the interfering wave that is at the threshold or below, the absence of a slot which has the level of the interfering wave that is at the threshold or below is notified as the channel information.

At the time of slot selection, a determination is made starting from the (−93, 4) combination in the lowermost part, and is then made in this sequence: the (−87, 4) combination in the second lowermost part, a (−81, 4) combination in the third lowermost part, and so forth up to the combination in the uppermost part. An operation is performed in such a manner that the channel information is notified based on a combination that first satisfies a condition for the number of empty slots.

Next, an example of an operation according to carrier sense table 111 is described above in association with the example of the operation of selecting the slot for base unit 1 in Step: 200 in FIG. 4, which is described above, is described.

FIG. 6 is a diagram illustrating an example of each frequency for the base unit according to the first exemplary embodiment of the present invention, an interfering wave for every slot, and a slot that is selected at that time. FIG. 6 illustrates an example of a combination of each frequency that is stored in carrier sense table 111 and the interfering wave for every slot, and an example of an empty slot and a threshold that are notified with the channel information that results when the channel information is generated using limitations in the threshold and the number of empty slots that are illustrated in FIG. 5, with respect to the interfering wave for every slot in each frequency.

Numbers 1 to 5 on the left side of FIG. 6 indicate frequency numbers, numbers 1 to 12 on the upper side indicate slot numbers, and a point at which the frequency number and the slot number intersect indicates the level of the interfering wave that results when the level of the interfering wave is detected with a frequency on the left side on a slot with the slot number on the upper side. In the following descriptions, slots are assumed to be expressed as being slot 1, slot 2, and so forth from the left column to the right column in order to specify a column in the vertical direction, and frequencies are assumed to be expressed as being frequency 1, frequency 2, and so forth in order to specify a row in the horizontal direction.

In FIG. 6, the level of the interfering wave for frequency 1 is 0 dbm on slot 1, and the levels of the interfering wave for frequency 1 on slots 2 to 12 are −20 dbm. At this time, when the channel information is generated based on a determination reference in FIG. 5, because the levels of the interfering wave for frequency 1 on all slots exceed −33 dbm, frequency=1, threshold=−33 dbm, and slot="none" are generated as the channel information.

In the same manner, the level of the interfering wave for frequency 2 on slot 1 is 0 dbm, the level of the interfering wave for frequency 2 on slot 3 is −35 dbm, and the levels of the interfering wave for frequency 2 on the other slots are −20 dbm. At this time, when the channel information is generated based on a determination reference in FIG. 5, the level of the interfering wave for frequency 2 on slot 3 satisfies the condition "−33 dbm or less", and thus frequency=2, threshold=−33 dbm, and slot=3 are generated as the channel information.

In the same manner, the level of the interfering wave for frequency 3 on slot 1 is 0 dbm, the level of the interfering wave for frequency 3 on slot 2 is −90 dbm, the level of the interfering wave for frequency 3 on slot 3 is −80 dbm, the level of the interfering wave for frequency 3 on slot 4 is −70 dbm, and the levels of the interfering wave for frequency 3 on the other slots are −20 dbm. At this point, when the channel information is generated based on the determination reference in FIG. 5, if threshold=−87 dbm or less, it is determined that slot 2 is an empty slot. Furthermore, if threshold=−75 dbm or less, it is determined that slot 3 is an empty slot, and if threshold=−69 dbm or less, it is determined that slot 4 is an empty slot. That is, if threshold=−75 dbm, the number of empty slots is 2 and thus the condition is not satisfied. If threshold=−69 dbm, the number of empty slots is 3 and thus the condition is first satisfied. Because of this, frequency=3, threshold=−69 dbm, and slot=(2, 3, 4) are generated as the channel information.

In the same manner, the level of the interfering wave for frequency 4 on slot 1 is 0 dbm, the level of the interfering wave for frequency 4 on slot 2 is −90 dbm, the level of the interfering wave for frequency 4 on slot 3 is −80 dbm, the level of the interfering wave for frequency 4 on slot 4 is −70 dbm, the level of the interfering wave for frequency 4 on slot 5 is −70 dbm, and the levels of the interfering wave for frequency 4 on the other slots are −20 dbm. At this point, when the channel information is generated based on the determination reference in FIG. 5, if threshold=−87 dbm or less, it is determined that slot 2 is an empty slot. Furthermore, if threshold=−75 dbm or less, it is determined that slot 3 is an empty slot, and if threshold=−69 dbm or less, it is determined that slot 4 and slot 5 are empty slots. That is, if threshold=−75 dbm, the number of empty slots is 2 and thus the condition is not satisfied. If threshold=−69 dbm, the number of empty slots is 4 and thus the condition is first satisfied. Because of this, frequency=4, threshold=−69 dbm, and slot=(1, 2, 3, 4, 5) are generated as the channel information.

In the same manner, the level of the interfering wave for frequency 5 on slot 1 is 0 dbm, the levels of the interfering wave for frequency 5 on slot 2, slot 3, and slot 4 are −95 dbm, and the levels of the interfering wave for frequency 5 on the other slots are −20 dbm. At this point, when the channel information is generated based on the determination reference in FIG. 5, it is determined with all thresholds that slot 2, slot 3, and slot 4 are empty slots. However, because the number of necessary empty slots is 4 until threshold=−81 dbm, the condition is not satisfied. If threshold=−75 dbm, the number of necessary empty slots is decreased to 3 and thus the condition is first satisfied. Because of this, frequency=5, threshold=−75 dbm, and slot=(2, 3, 4) are generated as the channel information.

In a frequency that is designated by control unit 120, channel selection unit 110 uses reception signal strength of an interfering wave that is stored in carrier sense table 111, a threshold of the reception signal strength of the interfering wave, and a threshold of the number of empty slots that is determined for every threshold of the reception signal strength of the interfering wave, and thus determines a threshold of the reception signal strength that satisfies the threshold of the number of empty slots and selects a slot that satisfies the determined threshold of the reception signal strength of the interfering wave. A channel selection operation in channel selection unit 110 will be described below.

Figure 7:
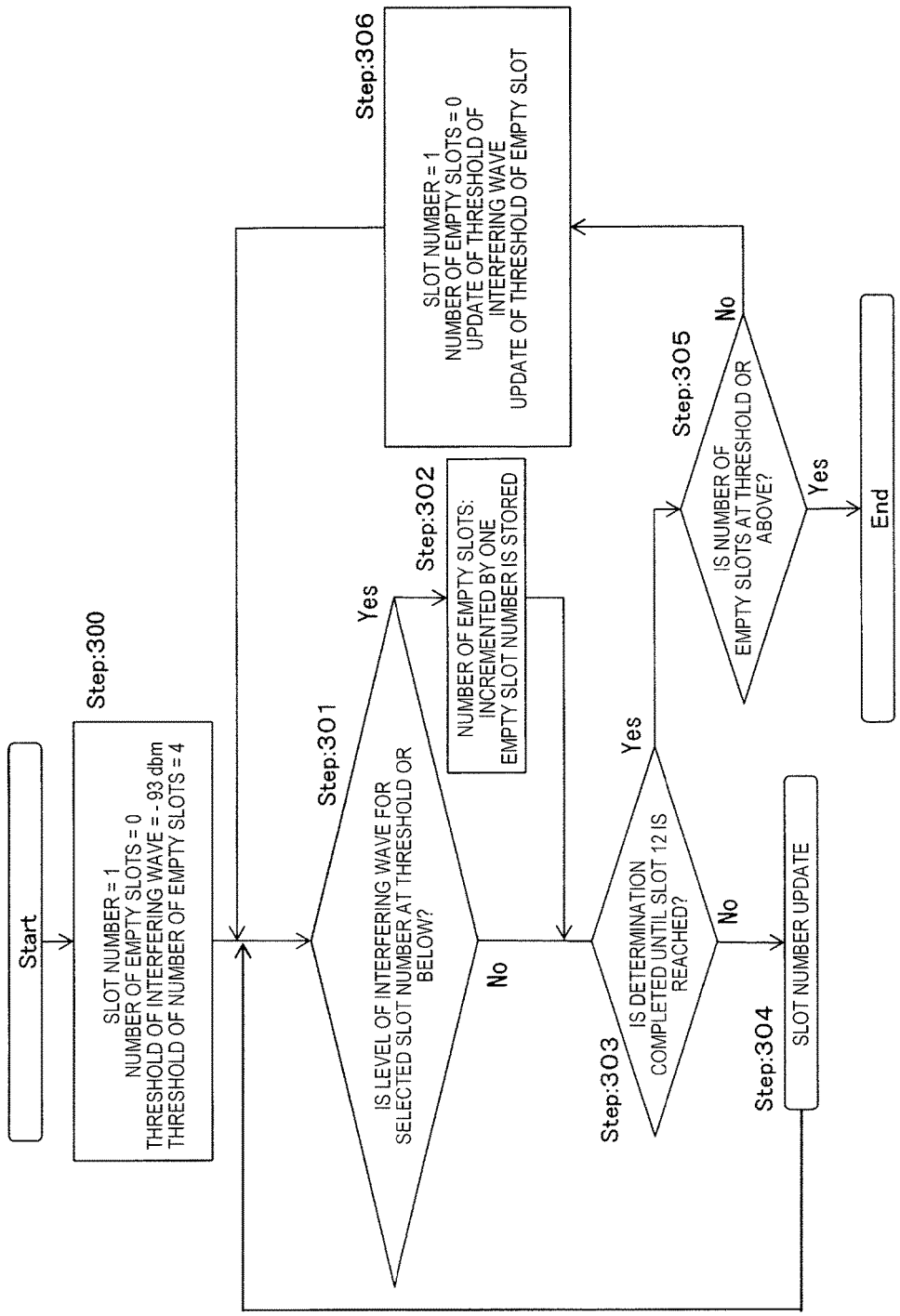
FIG. 7 is a flowchart illustrating an operation at the time of slot selection in the base unit according to the first exemplary embodiment of the present invention.

Next, an example of an operation is described referring to FIG. 7, in association with the example of the selection of selecting the slot for generating the channel information for base unit 1 in Step: 200 in FIG. 4, which is described above.

FIG. 7 is a flowchart illustrating an operation at the time of slot selection in the base unit according to the first exemplary embodiment of the present invention. In the following descriptions, a slot selection operation in channel selection unit 110 in a case where a correspondence between the threshold of the interfering wave and the number of empty slots for selecting the slot is as described above referring to FIG. 5, and carrier sense table 111 is as described above referring to FIG. 6 is described as an example.

In the frequency that is designated by control unit 120, channel selection unit 110 of base unit 1 makes a comparison with the lowest threshold, starting from slot 1, and determines a threshold and a slot.

First of all, an initial value (1 in the present example) of the slot number, an initial value of a counter for counting the number of empty slots, an initial value (−93 dbm in the present example) of the threshold for the interfering wave, and an initial value of a threshold (4 in the present example) of the number of necessary empty slots are given (Step: 300).

The level of the interfering wave that corresponds to the frequency that is designated by control unit 120 and the slot number is read from carrier sense table 111, and is compared with the threshold of the interfering wave that is selected (Step: 301).

In a case where a measurement value of the level of the interfering wave, which is read from carrier sense table 111, does not exceed the threshold of the interfering wave (Yes), the counter for counting the number of empty slots is increased (Step: 302), the slot number is stored, and proceeding to Step: 303 takes place.

In a case where the measurement value of the level of the interfering wave, which is read from carrier sense table 111, exceeds the threshold of the interfering wave (No), direct proceeding to Step: 303 takes place.

In Step: 303, it is determined that the determination in relation to all slots is terminated. In Step: 303, in a case where the determination in relation to all slots is not finished (No), the slot number is increased by one in this sequence: slot 1, slot 2, and so forth up to slot 12 (Step: 304), returning to Step: 301 takes place, a comparison between the measurement value that is stored in carrier sense table 111 and the threshold of the interfering wave is repeatedly made until slot 12 is reached while the loop continues, the counter for counting the number of empty slots is increased, and a number of the empty slot is stored.

In Step: 303, in a case where the determination in relation to all slots is finished (Yes), proceeding to Step: 305 takes place, and a comparison between the threshold of the number of empty slots and a value of the counter for counting the number of empty slots is made. In Step: 305, in a case where the value of the counter for counting the number of empty slots does not reach the threshold of the number of empty slots (No), the slot number is returned to an initial value (1 in the present example), the counter for counting the number of empty slots is initialized, the thresholds of the interfering wave are updated in this sequence: −93 dbm, −87 dbm, −80 dbm, and so forth, the threshold of the number of empty slots in accordance with the threshold of the interfering wave is set (Step: 306), and returning to Step: 301 takes place.

In Step: 305, in a case where the value of the counter for counting the number of empty slots reaches the threshold of the number of empty slots (Yes), processing is terminated that selects the threshold of the interfering wave and the empty slot in a case where the channel information is generated with the frequency that is designated by control unit 120. At this time, a combination of the slot that is stored in Step: 302, the threshold of the last interfering wave, and the frequency that is designated at that time is transmitted as the channel information by base unit 1.

The embodiment of the present invention is described above. As described above, in the wireless communication device according to the present invention, the minimum number of slots that are selected and that are notified according to a threshold of interfering wave detection is guaranteed. In an environment where the interfering wave does not frequently occur, the freedom of selection is high in the handset in which the level of the interfering wave is low and many slots are selected. In an environment where the interfering wave frequently occurs, narrowing down to the slot with a low level of the interfering wave can be performed, and with the selection of a favorable communication path in a communication environment, the communication can be performed.

As described above, in the wireless communication device according to the present invention, choices of slot choices are made according to a wireless environment that randomly changes in the base unit. Furthermore, in an environment where multiple slots are possible, the same slot cannot be successively used. Thus, the randomness of channel selection can be improved, and a risk of channel collision that arises from biased channel selection can be reduced.

As described, in the wireless communication device according to the present invention, priority that is assigned when a slot is selected changes from one slot to another, and the wireless link in which each slot is used is distributed in an equally-distributed manner. Because of this, furthermore, the risk of the channel collision that arises from the biased channel selection can be reduced.

The handset can power off a main portion necessary for the wireless communication in the waiting state. Thus, power consumption is reduced.

In a case of establishing a crime prevention system, there occurs a need to accommodate many crime prevention sensors, and the availability of wireless communication as well as the ease of installation is required. Furthermore, the maximum life of the crime prevention sensor is required in a case where the crime prevention sensor is battery-operated. Because with the configuration of the wireless communication device according to the present invention, the power consumption by the crime prevention sensor can be reduced, the maximum life of the crime prevention sensor can be realized. Because the slots that are used for the communication are equally distributed, although the number of installed crime prevention sensors is increased, collision among the installed crime prevention sensors can be avoided. This provides an advantage. With a slot selection method, the handset (slave station) can be constructed from a simple logic and a small storage unit. In a case where the sensor is constructed using a CPU, an amount of ROM/RAM usage can be suppressed from increasing and a cost can be suppressed from going up.

The wireless communication device according to the present invention is useful as a wireless communication device for building a home network.

What is claimed is:
1. A wireless communication device comprising:
a control station; and
a slave station,
wherein the control station and the slave station perform communication with each other using a time division multiplex scheme,
wherein the control station transmits channel information indicating a slot that is available for data transmission from the slave station,
wherein the slave station selects the slot included in the transmitted channel information, and activates the communication with the control station,
wherein the control station includes:
a wireless communication interface that performs wireless communication,
a memory that stores a plurality of interfering wave thresholds, each interfering wave threshold of the plurality of interfering wave thresholds being associated with a number of empty slots,
a storage that stores a reception signal strength of an interfering wave for each slot of a plurality of slots, for a predetermined frequency, and, a processor, when executing a control program, that performs operations comprising:
  setting an interfering wave threshold, which is selected from the plurality of interfering wave thresholds stored in the memory;
  setting a threshold number of empty slots, by selecting the number of empty slots associated with the set interfering wave threshold;
  performing a comparison between the reception signal strength of each slot of the plurality of slots and the set interfering wave threshold;
  counting a number of slots, of the plurality of slots, in which the reception signal strength of the slots is equal to or smaller than the set interfering wave threshold, based on a result of the comparison;
  determining whether the counted number of slots is equal to or greater than the set number of empty slots;
  when it is determined that the counted number of slots is equal to or greater than the set threshold number of empty slots, transmitting, to the slave station, the channel information indicating the slots in which the reception signal strength of the slots is equal to or smaller than the set interfering wave threshold; and
  when it is determined that the counted number of slots is smaller than the set threshold number of empty slots, returning the operations to the setting of the interfering wave threshold by selecting an other interfering wave threshold from the plurality of interference wave thresholds stored in the memory, the other interfering wave threshold being higher than the set interfering wave threshold,
wherein, in the setting of the interfering wave threshold, a lowest interfering wave threshold is selected from the plurality of thresholds stored in the memory, as an initial interfering wave threshold,
wherein, after returning the operations to the setting of the interfering wave threshold, the processor repeats the operations starting from the setting of the interfering wave threshold, until it is determined that the counted number of slots is equal to or greater than the set threshold number of empty slots.

2. The wireless communication device of claim 1, wherein the slave station determines a priority of each slot to select the slot, such that a previously-communicated slot has a lowest priority, the previously-communicated slot being a slot that was used in a previous communication.

3. The wireless communication device of claim 1, wherein
  the predetermined frequency comprises a plurality of frequencies,
  the storage stores, for each of the plurality of frequencies, the reception signal strength of an interfering wave for each slot of the plurality of slots, and
  the processor performs the operations starting with the setting of the interfering wave threshold to the selecting the other interfering wave threshold, for each frequency of the plurality of frequencies.

4. The wireless communication device of claim 1, wherein the processor further controls the wireless communication interface to measure the reception signal strength of the interfering wave for each slot of the plurality of slots, and stores the measured reception signal strength into the storage.

* * * * *